United States Patent [19]

Katsamberis

[11] Patent Number: 5,426,131
[45] Date of Patent: Jun. 20, 1995

[54] ACRYLIC COATED THERMOPLASTIC SUBSTRATE

[75] Inventor: Dimitris Katsamberis, Mt. Vernon, Ind.

[73] Assignee: General Electric Company, Pittsfield, Mass.

[21] Appl. No.: 135,711

[22] Filed: Oct. 13, 1993

Related U.S. Application Data

[62] Division of Ser. No. 481,526, Feb. 16, 1990, Pat. No. 5,258,225.

[51] Int. Cl.$^6$ ............................................. C08G 18/04
[52] U.S. Cl. ........................................ 522/16; 522/17; 522/77; 522/90; 522/91; 522/96; 522/97; 524/850
[58] Field of Search ................ 522/16, 90, 17, 91, 522/77, 96, 97; 524/850

[56] References Cited

U.S. PATENT DOCUMENTS

| | | | |
|---|---|---|---|
| 2,786,042 | 3/1957 | Iler | 525/316 |
| 3,871,908 | 3/1975 | Spoor et al. | 117/93.31 |
| 4,107,391 | 8/1978 | Moore et al. | 428/483 |
| 4,198,465 | 4/1980 | Moore et al. | 428/409 |
| 4,218,508 | 8/1990 | Humphrey, Jr. | 428/331 |
| 4,353,965 | 10/1982 | Olson et al. | 428/412 |
| 4,455,205 | 6/1984 | Olson et al. | 524/291 |
| 4,478,876 | 10/1984 | Chung | 428/447 |
| 4,486,504 | 12/1984 | Chung | 428/412 |
| 4,491,508 | 1/1983 | Olson et al. | 528/26 |
| 4,507,188 | 3/1985 | Chu | 526/301 |
| 4,561,950 | 12/1985 | Leo | 522/91 |
| 4,598,009 | 7/1986 | Christie et al. | 428/172 |
| 4,929,506 | 5/1990 | Kerr, III et al. | 428/412 |

FOREIGN PATENT DOCUMENTS 0228671 7/1987 European Pat. Off. .

OTHER PUBLICATIONS

An Overview of Recent Advances in the Chemistry of Polyurethanes, pp. 12–33, 1977.
Speckhard; Jrnl. App. Polymer Science vol. 30, pp. 647–666 (1985) Properties of UV-Curable Polymethane Acrylates Effect of Reactive Diluent.
Boone; UV Curing Science and Technology, Ch. 4, pp. 109–142, 1985.
Molecular Behavior and the Development of Polymeric Materials "The Chemistry and Technology of Polyurethanes" 1975.
Die Angewandte Makromolekulare Chemie 160 (1988) 41–66.
Article: Polymer Engineering and Science, Mid–Nov. 1986, vol. 26, No. 20 Opp. 1442–1450 C. M. Nagarajan; "Synthesis and Characterization of Radiation Curable Polyurethanes".
Article: Barclay–Acrylated Urethane Oligomers New Raw Materials for Adhesives–Radiation Curing, Aug. 1979 pp. 4–11 Radiation Curing.
Article: Modern Paint and Coatings, Part 1, Jun. and Part. 2 Aug. 1982 F. S. Stowe; "Specialty Reactive Monomers to RC Coatings".
Product Information Sheet: Radcure Specialties Inc., EBECRYL 19–6264 Jan. 1984.
Article: Miller–Radiation Curing Acrylourethane Resin Design–May 1984, pp. 4–9.
Product Information Sheet: Radcure Specialties, Inc.-.–Ebecryl 19–6230 Jan. 1984.

Primary Examiner—John Kight, III
Assistant Examiner—R. F. Johnson

[57] ABSTRACT

An ultraviolet radiation curable silica coating composition containing (a) acrylic monomers, (b) functionalized colloidal silica, (c) acrylated urethanes, (d) an ultraviolet radiation absorber, and (e) a photoinitiator. The coating composition once applied to and cured on a thermoplastic substrate provides a coating which exhibits improved flexibility and weathering. The coatings are useful for providing abrasion resistance and weatherability to thermoplastic, for example polycarbonate, substrates.

7 Claims, No Drawings

ACRYLIC COATED THERMOPLASTIC SUBSTRATE

This is a divisional of application Ser. No. 07/481,526, now U.S. Pat. No. 5,258,225, filed on Feb. 16, 1990.

BACKGROUND OF THE INVENTION

1. Field of the Invention

The present invention relates to coatings and coated thermoplastic substrates, and more particularly relates to solvent less and primerless ultraviolet radiation cured silica containing coatings on thermoplastic substrates.

2. Description of Related Art

Thermoplastic substrates, such as polycarbonate sheet and film, have found many commercial applications including for example glazing or automotive headlamp applications. One widely used thermoplastic substrate is bisphenol A polycarbonate such as that known as LEXAN® polycarbonate resin, sold by General Electric Company. While polycarbonate resin is a tough transparent material, it is generally desirable to improve its abrasion resistance and weathering resistance. Prior attempts to improve the abrasion resistance of these substrates have involved heat curing silicone coating systems onto the substrates. Heat cured silicone coatings have generally required the use of primer layers to promote adhesion to the substrate. Heat cure processes are slower than ultraviolet radiation cured coating systems. Ultraviolet radiation cured abrasion resistant coating compositions have been developed which can be applied directly to a thermoplastic substrate without the use of a primer layer. For example Chung, U.S. Pat. No. 4,486,504, discloses a solventless ultraviolet radiation-curable coating composition comprising (a) colloidal silica, (b) the acid hydrolysis product of an acryloxyfunctional or glycidoxyfunctional silane or mixtures of the functional silanes, and (c) a photoinitiator. Chung '504 discloses that the coating composition may be applied directly to a substrate, such as polyester film, and cured in one pass of UV radiation in a matter of seconds to yield adherent, abrasion resistant coatings. Another abrasion resistant UV curable coating composition is disclosed in Chung, U.S. Pat. No. 4,478,876, which teaches a composition comprising a multifunctional acrylate monomer, colloidal silica, acryloxyfunctional silanes and photoinitiators. Furthermore, Olson, et. al., U.S. Pat. No. 4,455,205, discloses a UV curable silica hardcoat containing a photoinitiator, the hydrolysis product of silylacrylate aqueous colloidal silica, and optionally a multifunctional acrylate. While the above UV radiation curable silica coatings provide adherent and abrasion resistant coated articles when cured on polycarbonate substrates, for outdoor applications it is desirable to improve upon their weatherability.

Accordingly, one object of the present invention is to provide a UV curable silica coating composition providing cured coatings exhibiting improved weatherability.

SUMMARY OF THE INVENTION

The present invention involves ultraviolet radiation curable coating compositions comprising respective amounts of (a) multifunctional acrylate ester monomers; (b) acrylate functionalize colloidal silica; (c) acrylated urethanes; (d) an ultraviolet radiation absorber; and (e) a photoinitiator. The coating compositions when cured onto polycarbonate substrates produce abrasion resistant coatings exhibiting improved weatherability and flexibility.

DETAILED DESCRIPTION OF THE INVENTION

The coating compositions comprise respective amounts of (a) multifunctional acrylate ester monomers; (b) acrylate functionalized colloidal silica; (c) acrylated urethanes; (d) an ultraviolet radiation absorber; and (e) a photoinitiator.

The coating composition may be applied to and cured on various thermoplastic substrates including, for example, polycarbonate resin substrates and polyester resin substrates to produce abrasion resistant thermoplastic articles. Suitable substrates are made from polycarbonate resin which is preferably derived from bisphenol-A (2,2-bis(4-hydroxyphenyl)propane) and a carbonate precursor. To exemplify the practice of this invention, any of the aromatic polycarbonates can be employed to provide suitable substrates to be coated. These are homopolymers and copolymers and mixtures thereof that are prepared by reacting a dihydric phenol with a carbonate precursor. Typical of some of the dihydric phenols that may be employed in the practice of this invention are bisphenol-A (2,2-bis(4-hydroxyphenyl)propane), bis(4-hydroxyphenyl)methane, 2,2-bis(4-hydroxy-3-methylphenyl)-propane, 3,3-bis(4-hydroxyphenyl)pentane, 2,2-bis-(3,5-dichloro-4-hydroxyphenyl)propane, 2,2-bis(3,5-dibromo-4-hydroxyphenyl)propane, and bis(3-chloro-4-hydroxyphenyl)methane. Other dihydric phenols of the bisphenol type are also available and are disclosed in U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer substrate.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di(halophenyl)carbonates such as di (chlorophenyl)-carbonate, di(bromophenyl)carbonate, di(trichlorophenyl)carbonate, di(tribromophenyl)carbonate, etc., di(alkylphenyl)carbonates such as di(tolyl)carbonate, etc., di(naphthyl)carbonate, di(chloronaphthyl)carbonate, phenyl tolyl carbonate, chlorophenyl chloronaphthyl carbonate, etc., or mixtures thereof. The haloformates suitable for use herein include bishaloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The aromatic carbonate polymer substrates for the coating compositions of this invention may be prepared by employing a molecular weight regulator, an acid acceptor and a catalyst. The molecular weight regulators which can be employed in carrying out the process of this invention include monohydric phenols such as phenol, chroman-I, para-tertiary-butyl-phenol, para-bromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed to provide a suitable polycarbonate substrate can be any of the suitable catalysts that aid the polymerization of bisphenol-A with phosgene. Suitable catalysts include tertiary amines such as, for example, triethylamine, tripropylamine, N,N-dimethylaniline, quarternary ammonium compounds such as, for example, tetraethylammonium bromide, cetyl triethyl ammonium bromide, tetra-n-heptyl-ammonium iodide, tetra-n-propyl ammonium bromide, tetramethyl ammonium chloride, tetramethyl ammonium hydroxide, tetra-n-butyl-ammonium iodide, benzyltrimethylammonium chloride and quarternary phosphonium compounds such as, for example, n-butyl-triphenyl phosphonium bromide and methyltriphenyl phosphonium bromide.

Also included therein are branched polycarbonates wherein a multifunctional aromatic compound is reacted with the dihydric phenol and carbonate precursor to provide a thermoplastic randomly branched polycarbonate.

These multifunctional aromatic compounds contain at least three functional groups which are carboxyl, carboxylic anhydride, or haloformyl groups or mixtures thereof. Examples of these multifunctional aromatic compounds which may be employed include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred multifunctional aromatic compounds are trimellitic anhydride or trimellitic acid, or their haloformyl derivatives.

Also included herein are blends of a linear polycarbonate and a branched polycarbonate.

It is to be understood that the utility of the coating compositions of the present invention is not limited to the polycarbonates described above. There are numerous other classes of substrates which may be suitably rendered mar and abrasion resistant by the coatings and processes disclosed herein. Among these other substrates are such sheet, film and molded substrates as polyester and polymethylmethacrylate and other high strength films such as polyacrylates, polyamides, nylon and plastic surfaces which have been metalized by such techniques as sputtering, electroplating and vapor deposition.

The term acrylic monomers is meant to mean multifunctional acrylate ester monomers as defined below.

Multifunctional acrylate ester monomers are another of the basic ingredients used in the coating composition of the present invention and are represented by the general formula:

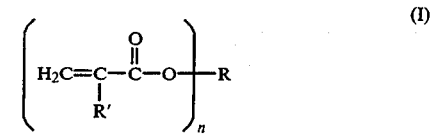

wherein n is an integer from 1 to 4, and more preferably from 2 to 3; and R is selected from the group consisting of n functional hydrocarbon residues, n functional substituted hydrocarbon residues; and R' is hydrogen or a lower alkyl radical such as methyl.

The term multifunctional acrylate monomers is meant to include alkylacrylates such as multifunctional methacrylates.

Preferred n functional hydrocarbon residues are the n functional aliphatic, preferably saturated aliphatic, hydrocarbon residues containing from 1 to about 20 carbon atoms and the n functinal aromatic hydrocarbon residues containing from 6 to about 10 carbon atoms.

Preferred n functional substituted hydrocarbon residues are the n functional aliphatic hydrocarbon residues, preferably the saturated aliphatic hydrocarbon residues, containing from 1 to about 20 carbon atoms, and the n functional aromatic hydrocarbon residues containing from 6 to about 10 carbon atoms which contain substituent groups such as the halogens, i.e., fluorine, chlorine, bromine, and iodine, hydroxyl, —COOH, and —COOR' groups wherein R' represents alkyl groups containing from 1 to about 6 carbon atoms.

Preferred n functional substituted hydrocarbon residues are the n functional aliphatic, preferably saturated aliphatic, hydrocarbon residues containing from 2 to about 20 carbon atoms which contain substituent groups such as the halogen hydroxyl, —COOH, and —COOR' groups wherein R' is as defined above. It is to be understood that where substituent groups are present, they should be such that they do not unduly hinder or interfere with the photocure of the multifunctional acrylic monomers. The more preferred multifunctional acrylic monomers are those represented by formula (I) wherein R is selected from the group consisting of an n functional saturated aliphatic hydrocarbon residue containing from 1 to about 20 carbon atoms, a hydroxyl substituted n functional saturated aliphatic hydrocarbon residue containing from 1 to about 20 carbon atoms, an n functional saturated aliphatic hydrocarbon residue containing from 2 to about 20 carbon atoms, and a hydroxyl substituted n functional saturated aliphatic hydrocarbon residue containing from 2 to about 20 carbon atoms.

The preferred multifunctional acrylate ester monomers are those wherein R is an n functional saturated aliphatic hydrocarbon, with those monomers wherein R is an n valent saturated aliphatic hydrocarbon radical being more preferred.

More particularly, the difunctional acrylic monomers, or diacrylates, are represented by Formula (I) wherein n is 2; the trifunctional acrylic monomers, or triacrylates, are represented by Formula (I) wherein n is 3; and the tetrafunctional acrylic monomers, or tetraacrylates, are represented by Formula (I) wherein n is 4.

These multifunctional acrylate ester monomers and their production are well known to those skill in the art. One method of producing the di-, tri and tetraacrylate esters involves reacting acryl acid with a di, tri-, or tetrahydroxyl compound produce the diester, triester or tetraester. Thus, for example, acrylic acid can be reacted with ethylene glycol to produce ethylene glycol diacrylate.

Although the coating compositions may contain only one of said multifunctional acrylate monomers, preferred coating compositions contain a mixture of two multifunctional monomers, preferably a diacrylate and a triacrylate. When the coating compositions contain a mixture of acrylate monomers, it is preferred that the ratio, by weight, of the diacrylate to the triacrylate be from about 30/70 to about 70/30. Exemplary mixtures of di acrylates and triacrylates include mixtures of hexanediol diacrylate with pentaerythritol triacrylate, hexanediol diacrylate with trimethylolpropane triacrylate, diethyleneglycol diacrylate with pentaerythritol triacrylate, and diethyleneglycol diacrylate with trimethylolpropane triacrylate.

While the corresponding coatings may likewise contain the ultraviolet light reaction product of a single multifunctional acrylate monomer, coatings containing the photoreaction product of two multifunctional acrylate monomers, preferably a diacrylate and a triacrylate, are preferred. Chung, U.S. Pat. No. 4,478,876, lists specific suitable multifunctional acrylate ester monomers and is included herein by reference.

Acrylate functionalized colloidal silica is obtained by admixing the hydrolysis product of silylacrylate and aqueous colloidal silica and removing any solvent, for example water, therefrom as set forth in Olson, et. al., U.S. Pat. No. 4,491,508 which is incorporated herein by reference. Olson, et. al., U.S. Pat. No. 4,455,205, Chung, U.S. Pat. No. 4,478,876, and Chung, U.S. Pat. No. 4,486,504, are also incorporated herein by reference. Functionalized colloidal silica is colloidal silica which is dispersible in an organic medium due to the replacement of hydroxyl groups with organic groups. The term acrylate functionalized colloidal silica is meant to include alkylacrylate functionalized colloidal silica. The functional groups are preferably acrylate or methacrylate groups.

The silylacrylate is of the formula:

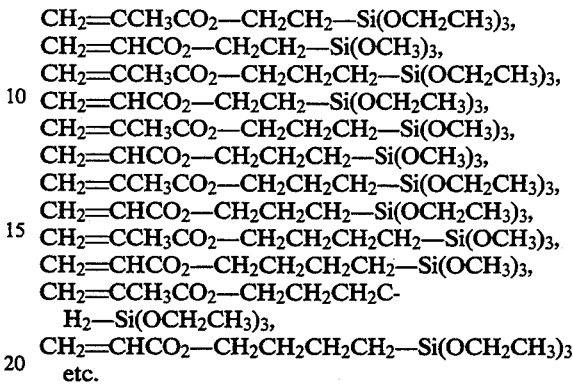

where $R^5$ is a $C_{(1-13)}$ monovalent radical, $R^1$ is a $C_{(1-8)}$ alkylene radical, a is a whole number equal to 0 to 2 inclusive, b is an integer equal to 1–3 inclusive, and the sum of a+b is equal to 1 to 3 inclusive.

$R^5$ of formula (II) is more particularly selected from $C_{(1-8)}$ alkyl, such as methyl, ethyl, propyl, butyl, etc.; aryl radicals and halogenated aryl radicals, for example, phenyl, tolyl, xylyl, naphthyl, chlorophenyl, etc.; radicals included within $R^1$ are, for example, all of the $C_{(1-8)}$ alkyl radicals included within $R^5$; radicals included within $R^2$ are hydrogen and the same or different radicals included within $R^5$. Divalent alkylene radicals included within $R^3$ are, for example, methylene, ethylene, trimethylene, tetramethylene, etc. Divalent organic radicals included within $R^3$ radicals are branched $C_{(2-8)}$ alkylene radicals, branched halogenated $C_{(2-8)}$ alkylene radicals, branched hydroxylated $C_{(2-8)}$ alkylene radicals, branched acrylate radicals, $C_{(6-13)}$ arylene radicals, for example, phenylene, tolylene, naphthylene, etc., halogenated $C_{(6-13)}$ arylene radicals, etc.

Included within the silyl acrylates of formula (II) are compounds having the formulas, $CH_2$=$CCH_3CO_2$—$CH_2CH_2$—$Si(OCH_2CH_3)_3$,
$CH_2$=$CHCO_2$—$CH_2CH_2$—$Si(OCH_3)_3$,
$CH_2$=$CCH_3CO_2$—$CH_2CH_2CH_2$—$Si(OCH_2CH_3)_3$,
$CH_2$=$CHCO_2$—$CH_2CH_2$—$Si(OCH_2CH_3)_3$,
$CH_2$=$CCH_3CO_2$—$CH_2CH_2CH_2$—$Si(OCH_3)_3$,
$CH_2$=$CHCO_2$—$CH_2CH_2CH_2$—$Si(OCH_3)_3$,
$CH_2$=$CCH_3CO_2$—$CH_2CH_2CH_2$—$Si(OCH_2CH_3)_3$,
$CH_2$=$CHCO_2$—$CH_2CH_2CH_2$—$Si(OCH_2CH_3)_3$,
$CH_2$=$CCH_3CO_2$—$CH_2CH_2CH_2CH_2$—$Si(OCH_3)_3$,
$CH_2$=$CHCO_2$—$CH_2CH_2CH_2CH_2$—$Si(OCH_3)_3$,
$CH_2$=$CCH_3CO_2$—$CH_2CH_2CH_2CH_2$—$Si(OCH_2CH_3)_3$,
$CH_2$=$CHCO_2$—$CH_2CH_2CH_2CH_2$—$Si(OCH_2CH_3)_3$,
etc.

The aqueous colloidal silica is a dispersion of submicron-sized silica ($SiO_2$) particles in an aqueous or other solvent medium. It is this polysiloxane backbone which provides the hardcoat composition with many of the advantages inherent in silicone products such as a wide-ranging resistance to environmental extremes.

Dispersions of colloidal silica are available from chemical manufacturers such as DuPont and Nalco Chemical Company. Colloidal silica is available in either acidic or basic form. However, for purposes of the present invention it is preferable that the acidic form be utilized. It has been found that superior hardcoat properties can be achieved with acidic colloidal silica (i.e. dispersions with low sodium content). Alkaline colloidal silica also may be converted to acidic colloidal silica with additions of acids such as HCl or $H_2SO_4$ along with high agitation.

An example of a satisfactory colloidal silica for use in these coating compositions is Nalcoag 1034A, available from Nalco Chemical Company, Chicago, Ill. Nalcoag 1034A is a high purity, acidic pH aqueous colloidal silica dispersion having a low $Na_2O$ content, a pH of approximately 3.1 and an $SiO_2$ content of approximately 34 percent by weight. In the examples given below the weight in grams or parts by weight of the colloidal silica includes its aqueous medium. Thus, for example, 520 grams of Nalcoag 1034A colloidal silica represents, approximately, 177 grams of $SiO_2$ by weight. It should be noted, however, that the aqueous medium is utilized as a convenient way of handling the colloidal silica and does not form a necessary part of the hardcoat compositions of the present invention. In fact, it is to be emphasized that these coating compositions find particularly beneficial utility in the fact that they may be part of a solventless system.

The term colloidal silica is intended to represent a wide variety of finely divided $SiO_2$ forms which can, be utilized to form the hardcoat compositions of the present invention without the necessity of undue experimentation. Further description can be found in U.S. Pat. No. 4,027,073.

Acrylated urethanes are multifunctional aliphatic acrylated urethanes wherein the acrylic or methacrylic groups provide the functionality and suitable aliphatic acrylated urethanes are represented by the general formula:

$$(A^1)_{\overline{m}}B^1-Y^1-D^1-Y^1-B^1+A^1)_m \quad \text{(III)}$$

wherein each A is independently selected from the group consisting of monovalent radicals of the formula:

$$\begin{array}{c} \text{O} \quad \text{E}^1 \ \text{E}^1 \\ \| \quad | \quad | \\ -\text{O}-\text{C}-\text{C}=\text{C}-\text{E}^1 \end{array} \quad \text{(IV)}$$

wherein each $E^1$ is independently selected from the group consisting of hydrogen and monovalent aliphatic hydrocarbon radicals having from 1 to 13 carbon atoms, wherein each $B^1$ is independently selected from the group of respective m+1 valent aliphatic hydrocarbon radicals having from 1 to 8 carbon atoms, wherein each $y^1$ is independently selected from divalent radicals of the formula:

$$\begin{array}{c} \text{O} \ \text{B}^2 \quad \text{B}^2 \ \text{O} \\ \| \ | \quad | \ \| \\ \text{O}-\text{C}-\text{N}-\text{B}^3-\text{N}-\text{C}-\text{O} \end{array} \quad \text{(V)}$$

wherein each $B^2$ is preferably selected from the group consisting of hydrogen and monovalent aliphatic hydrocarbon radicals having from 1 to 8 carbon atoms; wherein $B^3$ is preferably a divalent aliphatic hydrocarbon radical having from 1 to 8 carbon atoms; and wherein $D^1$ is a divalent radical of a polyester, or a polydimethysiloxane diol. $D^1$ is preferably selected from divalent radicals of:

(a) polyesters having the formula:

$$\begin{array}{c} \text{O} \quad \text{O} \\ \| \quad \| \\ +\text{C}-\text{Y}^4-\text{C}-\text{O}-\text{Y}^5-\text{O})_{\overline{r}} \end{array}$$

and (b) polydimethylsiloxane diols having the formula:

$$\text{HO}-\text{Y}^6-\left[\begin{array}{c} \text{Y}^7 \\ | \\ \text{Si}-\text{O} \\ | \\ \text{Y}^7 \end{array}\right]_r \text{Y}^6-\text{OH}$$

wherein $y^4$, $y^5$, $y^6$ and $y^7$ are independently selected from divalent aliphatic hydrocarbons having from 1 to 8 carbon atoms, and r is from 1 to 500. The synthesis of suitable radiation curable polyurethanes containing pendant acrylate groups is disclosed in Nagarajan, *Synthesis and Characterization of Radiation Curable Polyurethanes Containing Pendant Acrylate Groups*, Polymer Engineering and Science, Mid-November, 1986, Vol. 26, No. 20, pg. 1442 to 1450. The reference teaches that a diisocyanate may be reacted with a diol to form a polyurethane having pendant hydroxyl groups which can then be reacted with an isocyanato ethyl methacrylate to yield a polyurethane containing pendant acrylate groups. Another UV-curable polyurethane acrylate resin is disclosed by Chiang, *Preparation and Properties of UV-Curable Polydimethylsiloxane Urethane Acrylate*, Die Angewandte Makromolekulare Chemie 160 (1988) 41–66 (Nr. 2573) pg. 41 to 66. Chiang discloses UV-curable polyurethane acrylate resin based on hydroxy terminated polydimethylsiloxane (PDMS) soft segments with molecular weight 1800 and 2,4-toluene diisocyanate (TDI)/2-hydroxyethyl methacrylate (HEMA) hard segments. Acrylated urethanes are commercially available. Acrylated polyurethanes are known coating materials that can provide flexible coatings. Applicant has discovered, however, that by employing an amount of acrylated urethanes in functionalized colloidal silica coatings the weatherability of the silica coatings is substantially improved. The term acrylated urethanes is meant to include alkylacrylated urethanes such as methacrylated urethanes.

The ultraviolet light absorbing compounds are well known in the art and are compounds which act to absorb or screen out the ultraviolet radiation. Illustrative of these compounds are those of the hydroxy benzophenone and benzotriazole series, the cyanoacrylates, and benzylidene malonates. Examples of these include: 2-hydroxy-4-n-octoxybenzophenone, substituted hydroxyphenylbenzotriazole, 2-(2'-hydroxy-5'-methylphenyl)-benzotriazole, 2-hydroxy-4-methoxybenzophenone, 2,2'-dihydroxybenzophenone, 2,2',4,4'-tetrahydroxybenzophenone, 2,2'-dihydroxy-4,4'-dimethoxybenzophenone, 2,2'-dihydroxy-4,4'-diethoxybenzophenone, 2,2'-dihydroxy-4,4'-dipropoxybenzophenone, 2,2'-dihydroxy-4,4'-dibutoxybenzophenone, 2,2'-dihydroxy-4-methoxy-4'-ethoxybenzophenone, 2,2'-dihydroxy-4-methoxy-4'-propoxybenzophenone, 2,2'-dihydroxy-4-methoxy-4'-butoxybenzophenone, 2-(2'-hydroxy-5'-tert-butyl phenyl)benzotriazole, 2-(2'-hydroxy-3'-methyl-5'-tert-butylphenyl)benzotriazole, 2-(2'-hydroxy-5'-cyclo-hexylphenyl)benzotriazole, 2-(2'-hydroxy-3',5'-dimethylphenyl)benzotriazole, ethyl 3,3'-diphenyl-2-cyanoacrylate, and octyl 3,3-diphenyl -2-cyanoacrylate. Further examples of ultraviolet light absorbers which may be used in the practice of this invention may be found in U.S. Pat. No. 3,043,709, which is incorporated herein by reference. A preferred ultraviolet radiation absorber is the benzene sulfonate ester of a benzotriazole (Cyasorb 5411 is a suitable benzotriazole ultraviolet radiation light absorber sold by American Cyanamid). Benzene sulfonate esters of benzotriazoles are set out in Olson, U.S. Pat. No. 4,344,830, which is incorporated herein by reference.

Suitable photoinitiative include the ketone-type photoinitiators such as benzophenone, and other acetophenones, benzil, benzaldehyde and 0-chlorobenzaldehyde, xanthone, thioxanthone, 2-clorothioxanthone, 9,10-phenanthrenenquinone, 9,10-anthraquinone, methylbenzoin ether, ethylbenzoin ether, isopropyl benzoin ether, a,a-diethoxyacetophenone, a,a-dimethoxyacetophenone, 1-phenyl-1,2-propanediol-2-o-benzoyl oxime, and a,a-dimethoxy-a-phenyl acetophenone. The preferred photoinitiator is diethoxyacetophenone.

The coating composition preferably contains the multifunctional acrylic ester monomers at a level selected from 10 percent by weight to 60 percent by weight based on the total weight of the coating composition, more preferably from 20 percent by weight to 50 percent by weight thereof and most preferably 40 percent by weight thereof; preferably lo contains the acrylate functionalized colloidal silica at a level selected from 20 percent by weight to 40 percent by weight based on the total weight of the composition, more preferably from 25 percent by weight to 35 percent by weight thereof and most preferably 32 percent by weight thereof; preferably contains the acrylated urethanes at a level selected from 5 percent by weight to 40 percent by weight based on the total weight of the composition, more preferably from 10 percent by weight to 30 percent by weight thereof and most preferably from 15 percent by weight to 20 percent by weight thereof; preferably the ultraviolet radiation absorber is present at a level of from 5 percent by weight to 10 percent by weight based on the total weight of the composition, more preferably from 6 percent by weight to 10 percent by weight, and most preferably 10 percent by weight thereof; and preferably the photoinitiator is present at a level selected from between 1 percent by weight to 5 percent by weight based on the total weight of the composition, more preferably from 2 percent by weight to 3 percent by weight thereof, and most preferably 2 percent by weight thereof.

The coating composition may be applied to the thermoplastic substrate in known ways including dipping and spraying and then exposed to ultraviolet radiation to provide a cured coating exhibiting abrasion resistance, adherence to the substrate, and improved weatherability and flexibility. A preferred process is set out in European Patent Application 0 228 671 filed Dec. 18, 1986 published Jul. 15, 1987 and incorporated herein by reference. The process involves applying the coating composition to a flexible transparent thermoplastic substrate, contacting the coating composition with a drum having the desired surface characteristics, ultraviolet radiation curing of the coating composition while the coating composition is in contact with the drum surface by passing UV radiation through the substrate and then separating the coated substrate from the drum surface.

The substrates may be of various shapes and thicknesses. Preferably the substrates are polycarbonate sheet or film having thicknesses of from 5 mils to 250 mils, more preferably from 10 mils to 30 mils and most preferably 15 mils.

The coating thickness is preferably from 2 micrometers to 30 micrometers, more preferably from 5 micrometers to 15 micrometers, and most preferably about 11 micrometers.

Amounts of antioxidants (such as IRGANOX 1076) and hindered amine light stabilizers (HALS) (such as Tinuvin 144) may be added to improve the weathering performance of certain coatings. Antioxidants and hindered aminelight stabilizers may be present at levels of from 0.1 to 1% by weight based on the total weight of the coating composition.

EXAMPLES

The following examples illustrate the present invention but are not meant to limit the scope thereof.

Examples 1 and 2 are compositions of the present invention and contain respective amounts of acrylate functionalized colloidal silica (silyl acrylate functionalizer plus colloidal silica), hexanedioldiacrylate, difunctional aliphatic acrylated urethane, benzene sulfonate ester of benzotriazole, and diethoxyacetophenone. Examples A and B are comparative examples containing respective amounts of functionalized colloidal silica, hexanediol diacrylate, trimethylolpropane triacrylate, benzene sulfonate ester of a benzotriazole and di ethoxyacetophenone.

TABLE 1

| Example | Flexibility (Radius inch) | Coating Thickness (μm) | Δ % H (500 cycles) | QUV Weathering | | | | Comments |
| --- | --- | --- | --- | --- | --- | --- | --- | --- |
| | | | | Hours | Δ % H | Δ Y I | Adhesion | |
| 1 | 0.5 | 11.6 | 14.5 | 2000 | 0.5 | 4.0 | Pass | |
| 2 | 0.5 | 13.3 | 20.5 | 2000 | 0.5 | 3.0 | Pass | |
| A | 1.0 | 10.0 | 14.0 | 2000 | 1.0 | 9.5 | Pass | Microcracks |
| B | 1.0 | 9.5 | 7.0 | 900 | 5.0 | 4.0 | Pass | Microcracks |

Note that examples 1 and 2 did not exhibit microcracks, whereas examples A and B did exhibit microcracks. Examples 1 and 2 exhibited improved flexibility and after QUV weathering exhibited reduced levels of hazing and yellowing in comparison to examples A and B.

The coating compositions of examples 1, 2, A and B were used to coat 15 mils polycarbonate film by the cold cast process (drum process of EP application 0 228 671) at speeds of 50 feet/min for examples 1, 2 and A and 30 feet/min for example B. The nip pressure for formulation 1 was 32 psi, 2 was 57 psi, A was 17 psi, and B was 10 psi. Casting drum temperature was 110° F. to 115° F. for all formulations. Examples 1, 2 and A were post cured under nitrogen at 20 feet/min under UV light energy of 476 MJ/cm$^2$ and B was post cured at 30 feet/min in air under UV light energy of 162 Mj/cm$^2$.

The coating composition of example 1 contained 3.6 grams of methacryloxypropyl trimethoxysilane (MAPTMS) which functionalizes the colloidal silica, 12 grams of colloidal silica (CS), 14.4 grams of hexanediol diacrylate (HDDA), 3.6 grams of difunctional aliphatic acrylated urethane (DAAU), 2.6 grams of benzene sulfonate of a benzotriazole (BSEX) and 0.8 grams of diethoxyacetophenone (DEAP).

The coating composition of example 2 contained 3.6 grams of MAPTMS, 12 grams of CS, 14.4 grams of HDDA, 7.2 grams of DAAU, 2.8 grams of BSEX and 0.8 grams DEAP.

The coating composition of example A contained 3.84 grams MAPTMS, 12.8 grams of CS, 11.68 grams of HDDA, 7.68 grams of trimethylol propane triacrylate (TMPTA), 2.8 grams BSEX, 0.8 grams DEAP, 0.2 grams Irganox 1056, 0.2 grams Tinuvin 144.

The coating composition of example B contained 4.8 grams MAPTMS, 16 grams CS, 15.3 grams HDDA, 9.6 grams of TMPTA, 3.5 grams BSEX, 1.0 gram DEAP, 0.25 gram Irganox 1076, 0.25 gram Tinuvin 144, 0.25 gram trilauryl phosphite and 4.7 grams HDDA.

QUV weathering is an accelerated weathering test performed on each of the cured polycarbonate panels by placing the panels in a QUV device sold by the Q-Panel Company of Cleveland, Ohio, set to consecutive cycles of fluorescent UV light for 8 hours at 70° C. and 4 hours of high humidity at 50° C. Adhesion testing of the cured coating on the polycarbonate substrate was done by scribing the coated area with a Gitterschnitt-Prufgerat cross-hatch cutter, applying Mystik 6432 tape to the cross-hatched area and readily pulling the tape from the cross-hatched area. Any coating removal by the tape constituted adhesive failure. Abrasion resistance was determined by measuring the change in haze (Δ % H) using a Gardner model UX 10 haze meter before and after 500 cycles of abrasing on a model 174

Taber Abraser equipped with CS-10F wheels and 500gm weights and before and after QUV weathering. ΔYI is the change in yellowness between before and after weathering.

What is claimed:

1. A solventless UV curable coating composition comprising:
   (a) at least one multifunctional acrylic ester monomer present at a level of from 10 percent by weight to 60 percent by weight based on the total weight of the composition;
   (b) at least one acrylate functionalized colloidal silica present at a level of from 20 percent by weight to 40 percent by weight based on the total weight of the composition;
   (c) at least one multifunctional aliphatic acrylated polyurethane present at a level of from 5 percent by weight to 40 percent by weight based on the total weight of the composition;
   (d) at least one ultraviolet light absorber present at a level of from 5 percent by weight to 10 percent by weight based on the total weight of the composition; and
   (e) at least one photoinitiator present at a level of from 1 percent by weight to 5 percent by weight based on the total weight of the composition.

2. The composition of claim 1 wherein said multifunctional acrylate ester monomer is hexanedioldiacrylate.

3. The composition of claim 1 wherein said multifunctional acrylated aliphatic urethane is a difunctional aliphatic acrylated urethane.

4. The composition of claim 1 wherein said acrylate functionalized colloidal silica is a methacrylate functionalized colloidal silica.

5. The composition of claim 1 wherein said photoinitiator is diethoxyacetophenone and said absorber is a benzene sulfonate ester of a benzotriazole.

6. A coating composition consisting essentially of:
   (a) hexanediol diacrylate present at a level of from 20 percent by weight to 50 percent by weight based on the total weight of the composition;
   (b) a methacrylate functionalized colloidal silica present at a level of from 25 percent by weight to 35 percent by weight based on the total weight of the composition;
   (c) a difunctional aliphatic acrylated urethane present at a level of from 10 percent by weight to 30 percent by weight based on the total weight of the composition;
   (d) an ultraviolet radiation absorber; and
   (e) a photoinitiator.

7. The coating composition of claim 1 further comprising from 0.1% to 1.0% by weight antioxidant based on the total wieght of said composition.

* * * * *